March 11, 1958     R. L. ROPIEQUET     2,826,694

FREE-RUNNING MULTIVIBRATOR

Filed March 10, 1955

INVENTOR.
Richard L. Ropiequet
BY
Agent

United States Patent Office 2,826,694
Patented Mar. 11, 1958

2,826,694

FREE-RUNNING MULTIVIBRATOR

Richard L. Ropiequet, Portland, Oreg., assignor to Tektronix, Inc., Portland, Oreg., a corporation of Oregon Application March 10, 1955, Serial No. 493,317

8 Claims. (Cl. 250—36)

This invention pertains to free-running multivibrators, and relates particularly to a cathode-coupled multivibrator which is arranged to operate in a free-running state and is characterized by providing high sensitivity to synchronization by input signals having a wide range of amplitudes and frequencies.

In the use of cathode ray oscilloscopes for analyzing electrical circuits by observing waveforms on a screen, recurrent signals are often encountered. Accordingly, it is desirable that the sweep waveform be synchronized with the recurrent signals, and one means providing this operation is a cathode-coupled, bi-stable sweep multivibrator of the Schmitt type, such as is described in the Journal of Scientific Instruments, 1938, volume 15, page 24. This type of multivibrator is characterized by producing a constant amplitude square wave output from any shape of input trigger signal. The square wave output can be differentiated to produce a constant amplitude, constant width trigger pulse, which may be used to trigger the sweep generator of the oscilloscope.

However, multivibrators heretofore provided for this purpose possess certain inherent limitations and require frequent delicate adjustments during use. For example, the cathode-coupled, bistable multivibrator of the Schmitt type inherently possesses hysteresis on the input grid, the hysteresis region being defined by upper and lower limits. That is to say, within a certain region of direct current voltage input to the multivibrator the state of activity of the latter is not known definitely, but it can be determined by knowing the direction from which the region is approached. It is required that a triggering signal must intercept these limits if reliable and stable operation is to be assured. In practice, this hysteresis heretofore has place certain limitations on the sensitivity of the multivibrator and therefore has limited the range of usefulness of the multivibrator.

One of these limitations resides in the requirement of a certain minimum hysteresis region, below which the multivibrator is prone to high frequency oscillation. This minimum requirement is dictated by the changes in circuit parameters due to aging, and results in the provision of a hysteresis region of such dimension as to render the multivibrator incapable of being triggered by input signals having amplitudes below a certain minimum.

A second limitation resides in the difficulty of maintaining the input grid potential exactly in the center of the hysteresis region, because of drift in the values of the circuit components. Thus, a given trigger signal which would normally effect triggering of the multivibrator when the potential is stabilized, will drift to a position at which it cannot intercept the hysteresis limit, thereby causing faulty operation of the multivibrator.

A third limitation resides in the fact that uni-directional trigger signals of low duty cycle frequently may not intercept both hysteresis limits, thereby resulting either in intermittent operation or in no output signal from the multivibrator.

Accordingly, it is a principal object of the present invention to provide a cathode-coupled multivibrator which overcomes the limitations and disadvantages discussed above, whereby to provide increased sensitivity to recurrent input signals above the natural frequency of oscillation of the multivibrator and over a wider range of amplitudes, compared with prior devices.

Another important object of this invention is the provision of a cathode-coupled multivibrator which produces, without adjustment, a shaped output signal synchronized with recurrent input signals of any shape over a wide range of amplitudes and frequencies above the natural frequency of oscillation of the multivibrator.

Still another important object of this invention is the provision of a cathode-coupled multivibrator which is capable of free-running operation without input signals, to produce a recurring square wave output signal.

A further important object of the present invention is to provide a cathode-coupled multivibrator which provides a symmetrical square wave output signal by means of a single timing circuit.

Still another important object of this invention is the provision of a cathode-coupled multivibrator capable of free-running operation without input signals and wherein the frequency of operation is adjustable over a substantial range.

A still further important object of the present invention is the provision of a cathode-coupled multivibrator which is of simplified construction and is precise and reliable in operation.

The foregoing and other objects and advantages of the present invention will appear from the following detailed description taken in connection with the accompanying drawing, in which.

Figure 1:
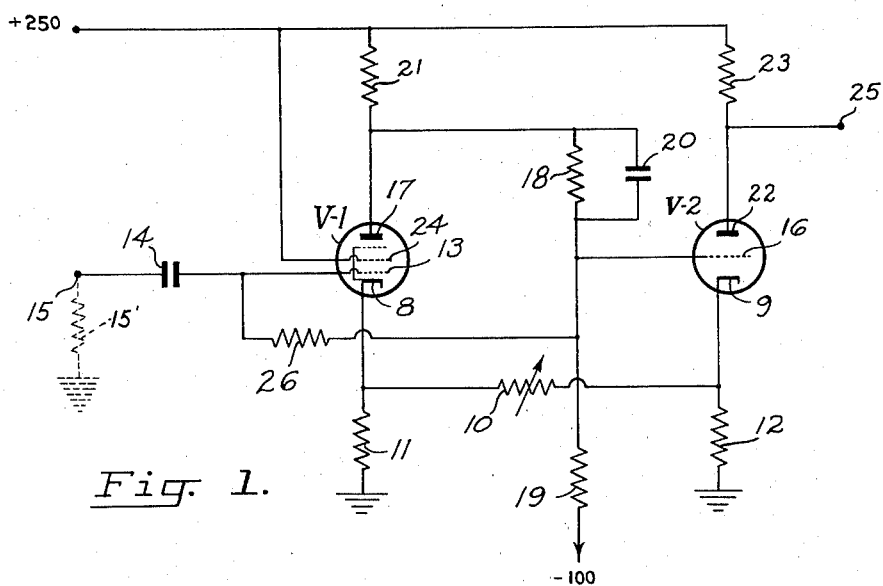
Figure 1 is a schematic circuit diagram of a free-running multivibrator embodying the features of the present invention.

Referring to Figure 1 of the drawing, the multivibrator of this invention is shown to be derived from a cathode-coupled bistable multivibrator of the Schmitt type. It includes the two vacuum tubes V1 and V2. The cathodes 8 and 9, respectively, of tubes V1 and V2 are connected together through variable resistance 10, and are also returned to ground potential through resistances 11 and 12, respectively. The control grid 13 of tube V1 is connected through capacitance 14 to terminal 15, to which external trigger signals may be applied, for purposes explained more fully hereinafter. In order best to explain hereinafter the cycle of operation of the multivibrator, the impedance of the external trigger source applied to terminal 15 is indicated in Figure 1 by the dotted representation of resistance 15'.

The grid 16 of tube V2 is direct coupled to the plate 17 of tube V1 through the voltage divider comprising resistances 18 and 19, the latter resistance being connected to the negative potential indicated. Resistance 18 is shunted by capacitance 20 which is chosen to frequency compensate the voltage divider 18, 19 and thereby maintain a rapid transition time for the multivibrator. In the absence of such compensation, there would be discrimination against high frequency signals due to stray capacitance between grid 16 and ground. Plate 17 of tube V1 is connected to the positive potential indicated through resistance 21, and plate 22 of tube V2 is connected to said positive potential through resistance 23. The screen grid 24 of tube V1 is connected to the positive potential indicated. The output signal is taken from the plate of tube V2, which is connected to terminal 25, for such uses as triggering the sweep generator of a cathode ray tube oscilloscope (not shown).

The multivibrator is controlled in both of its stable states of operation by the voltage on grid 13. Over a certain region of this control the grid exhibits hysteresis, and this region is identified in Figure 2 as lying between the lower limit 30 and the upper limit 31. Tube V1 is always cut off when the grid potential is below the lower limit 30 and is also cut off in the hysteresis region when approached from below the lower limit 30. On the other hand, tube V1 is always conducting when its grid potential is above the upper limit 31 and also in the hysteresis region when approached from above the upper limit 31.

In accordance with the present invention, the grids 13 and 16 are connected together through high resistance 26 to provide feedback from grid 16 to grid 13. By means of this feedback the effects of variations in the circuit parameters are compensated automatically to stabilize the hysteresis region at grid 13. Thus, the direct current potential at the grid is maintained at all times at the center of the hysteresis region and precise triggering of the multivibrator, even by signals of extremely small amplitude, is assured regardless of the width to which the hysteresis region is adjusted by resistance 10.

Figures 2, 5:
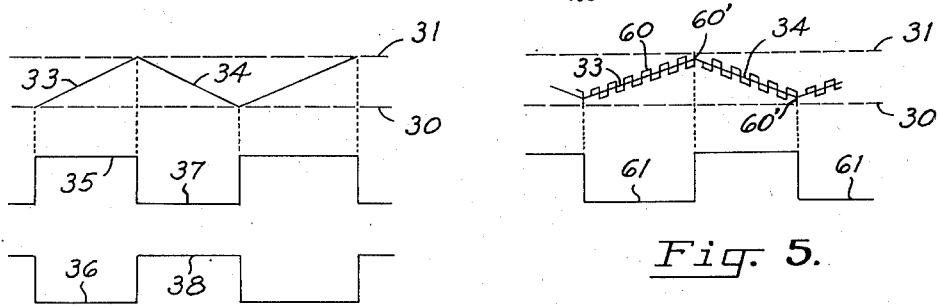
Figure 2 is a group of waveforms illustrating the mode of operation of the multivibrator with no external signals.
Figure 5 is a group of waveforms illustrating the mode of operation of the multivibrator with external trigger signals of very small amplitude and high frequency rate applied thereto.

Referring to Figure 2 of the drawing, when the multivibrator is energized from the various sources of potential, plate 17 rises immediately and carries with it the grid 16 of tube V2. Simultaneously, the grid 13 of tube V1 begins to rise, since it is connected to grid 16 through resistance 26. However, the rise of grid 13 is exponential, the curve 33 indicated in Figure 2 being in the substantially linear portion. This exponential rise is normally determined primarily by the time constant of resistance 26 and capacitance 14. Since recycling time is a function of the capacitance between grid 13 and ground, it will be apparent that the timing capacitance includes stray and interelectrode capacitance as well as capacitance 14. For the most rapid recycling rates, it may be desirable to use only stray and interelectrode capacitance. Normally, however, and particularly when external triggers are used, capacitance 14 is chosen to constitute the major timing capacitance. Although the external impedance 15' is in the timing circuit, its effect may be rendered negligible by making resistance 26 substantially greater than resistance 15'. Thus, the return for the timing circuit 14, 26 either is directly to ground when the external trigger source is not in use, or it is to ground through the low external resistance 15' normally present in the external trigger source when the latter is in use.

When the exponential rise of grid 13 crosses the upper hysteresis limit 31, plate current flows in tube V1 and grid 16 drops immediately below cut-off. The grid 13 of tube V1 simultaneously begins to drop exponentially toward cut-off as indicated at 34 in Figure 2. When grid 13 reaches the lower hysteresis limit 30, tube V1 is again cut off and the cycle is repeated.

During the exponential rise 33 of grid 13, the positive step 35 at grid 16 causes tube V2 to conduct, producing the negative step 36 at the output plate 22. During the exponential decay 34 of grid 13, the negative step 37 at grid 16 cuts off tube V2, producing the positive step 38 at the output plate 22. Since the exponential curves are both determined by the same time constant, the square wave output 36, 38 is symmetrical.

The cycle of operation is determined in part by the time constant of resistance 26 and capacitance 14, as discussed hereinbefore, and this time constant may be varied within wide limits. In addition, as explained hereinbefore, the extent of the hysteresis limits may be adjusted by varying the value of cathode coupling resistance 10, which functions to degenerate the amount of gain in the feedback loop. As an example, with a predetermined hysteresis range established by the adjustment of resistance 10, a time of .01 second for the grid 13 to rise exponentially from its starting point below cut-off to a point at which plate current can flow, provides a 50 cycle free-running rate of operation.

Figure 3:
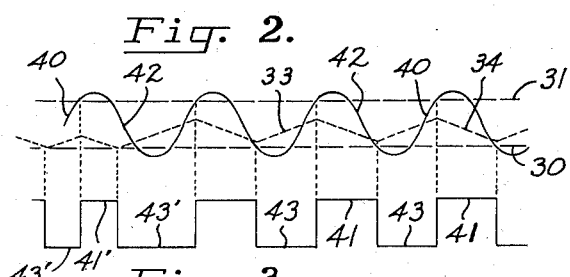
Figure 3 is a group of waveforms illustrating the mode of operation of the multivibrator with external trigger signals of large amplitude applied thereto.

Referring now to Figure 3 of the drawing, there is illustrated the mode of operation of the multivibrator when there is applied to terminal 15 an external sine wave signal having an amplitude greater than the hysteresis region defined by the limits 30, 31. As the positive-going portion 40 of the sine wave signal crosses the upper limit 31, tube V1 is brought into conduction and tube V2 is cut off. The plate of tube V2 immediately rises in potential to provide the positive step 41 and the grid 13 commences its exponential drop 34.

When the negative-going portion 42 of the sine wave signal crosses the lower hysteresis limit 30, plate current ceases to flow in tube VI and the grid 16 immediately rises to revert the multivibrator. Plate 22 drops in potential, producing the negative step 43. The direct current potential on grid 13 rises exponentially, on the curve 33, until the positive-going portion 40 of the sine wave signal crosses the upper hysteresis limit 31, once more to bring tube VI into conduction. Thus, the square wave output from the plate 22 of tube V2 is produced at the same frequency of the sine wave input. It is to be noted here that the square wave output identified at the left hand side in Figure 3 by the numerals 41' and 43' is irregular until the excursion of grid 13 is stabilized by the sine wave input.

Figure 4:
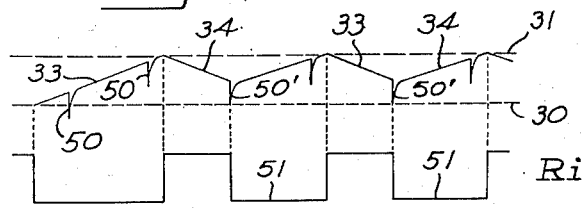
Figure 4 is a group of waveforms illustrating the mode of operation of the multivibrator with external trigger signals of small amplitude applied thereto.

Referring now to Figure 4 of the drawing, the negative pulses 50 applied to terminal 15 are shown to be smaller in amplitude than the hysteresis region defined by the limits 30, 31. Thus, the multivibrator operates in a free-running condition and is controlled only by those pulses which occur at a time on the negative going portion 34 of the exponential curve, at which they will intercept the lower hysteresis limit 30. Pulses 50' are shown in Figure 4 to be so positioned to trigger the multivibrator and to produce the negative steps 51 at the output plate 22. The remaining negative pulses 50 occur either on the rising exponential curve 33, and hence do not effect triggering, or at a time during the negative-going portion 34 at which the pulses do not intercept the lower hysteresis limit 30. However, those pulses 50' which do effect triggering of the multivibrator produce the negative steps 51 which, when differentiated and utilized to trigger the sweep generator of a cathode ray tube oscilloscope, produce a sawtooth sweep which is synchronized with said signal pulses.

Referring now to Figure 5 of the drawing, there is shown applied to input terminal 15 an external square wave signal 60 which is characterized by having very small amplitude and a high frequency rate. Because of these conditions, the free-running cycle of the multivibrator is maintained substantially at the 50 cycle rate exemplified hereinbefore, since the only trigger signals capable of triggering the multivibrator are those at 60' immediately adjacent the uppermost and lowermost ends of the positive and negative-going portions 33 and 34, respectively, of the exponential grid voltage curve. However, these signals 60' do effect triggering and reversion of the multivibrator, and the negative step 61 produced at the output plate 21 produces a saw-tooth sweep for a cathode ray tube oscilloscope, which sawtooth sweep is synchronized with said signal.

From the foregoing, it is apparent that the multivibrator of the present invention affords several advantageous modes of operation. In Figure 2 of the drawing, the multivibrator is shown to function without external signals. In this respect, the multivibrator is of particular value when used in a cathode ray tube oscilloscope having a triggered sweep circuit, since it functions to provide a base line to indicate proper adjustment of the oscilloscope when no signal is applied to the vertical deflection system. In Figures 3, 4 and 5, the multivibrator is shown to function with external signals of various magnitudes and frequencies, which signals function to trigger the multivibrator. In this connection, the multivibrator is of particular use in the sweep system of a cathode ray oscilloscope, since the signals effect operation of the multivibrator to produce a sawtooth sweep which is synchronized with the signals.

The feedback between grid 16 and grid 13 increases substantially the sensitivity of the multivibrator to triggering, even by signals of minute amplitude and high frequency. Thus, operation of the multivibrator over a wide range of signal amplitudes and frequencies, and without the prior necessity for critical adjustments, is achieved.

In the illustrated construction, wherein a 50 cycle recurrent operation is provided, a generated sawtooth waveform will synchronize readily with recurrent trigger signals ranging from about 60 cycles to more than two megacycles. Thus, the multivibrator is useful in connection with cathode ray tube oscilloscopes for displaying signals differing widely in amplitude and triggering speed, without readjustment of the instrument.

It will be apparent to those skilled in the art that various changes may be made in the details of construction described hereinbefore without departing from the scope and spirit of this invention. For example, the function of the resistance-capacitance network 26, 14 alternatively may be provided by a delay line or network. The values of circuit components and reference potentials may be changed to modify the cycle of operation and to adapt the circuit to specific uses. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. A free-running multivibrator comprising a pair of electron discharge devices each having cathode, grid and plate elements connected to sources of operating potential, signal feedback means connecting said cathode elements together, conductive coupling means connecting the plate element of one of said discharge devices to the grid element of the other of said discharge devices, and frequency determining conductive feedback means interconnecting said grid elements and operative to feed back to the grid element of said one discharge device after a predetermined time delay a potential change occurring at the grid element of said other discharge device to the grid element of the said one discharge device.

2. A free-running multivibrator comprising a pair of electron discharge devices each having cathode, grid and plate elements connected to sources of operating potential, signal feedback means connecting said cathode elements together, conductive coupling means connecting the plate element of one of said discharge devices to the grid element of the other of said discharge devices, frequency determining conductive feedback means interconnecting said grid elements and operative to feed back to the grid element of said one discharge device after a predetermined time delay a potential change occurring at the grid element of said other discharge device to the grid element of the said one discharge device, and means for applying an external trigger signal to the grid element of said one discharge device.

3. A free-running multivibrator comprising a pair of electron discharge devices each having cathode, grid and plate elements connected to sources of operating potential, signal feedback means connecting said cathode elements together, conductive coupling means connecting the plate element of one of said discharge devices to the grid element of the other of said discharge devices, and frequency determining resistance-capacitance network means conductively connecting the potential changes at the grid element of said other discharge device to the grid element of the said one discharge device.

4. A free-running multivibrator comprising a pair of electron discharge devices each having cathode, grid and plate elements connected to sources of operating potential, variable resistance signal feedback means connecting said cathode elements together, voltage divider means conductively connecting the plate element of one of said discharge devices to the grid element of the other of said discharge devices, and frequency determining conductive feedback means interconnecting said grid elements and operative to feed back to the grid element of said one discharge device after a predetermined time delay a potential change occurring at the grid element of said other discharge device to the grid element of the said one discharge device.

5. A free-running multivibrator comprising a pair of electron discharge devices each having cathode, grid and plate elements connected to sources of operating potential, variable voltage divider signal feedback means connecting said cathode elements together, resistance means conductively connecting the plate element of one of said discharge devices to the grid element of the other of said discharge devices, frequency determining resistance-capacitance network means conductively connecting the potential changes at the grid element of said other discharge device to the grid element of the said one discharge device, and means for applying an external trigger signal to the grid element of said one discharge device.

6. A free-running cathode-coupled multivibrator comprising first and second electron discharge devices each having grid and plate elements connected to sources of operating potential, conductive coupling means connecting the plate element of the first discharge device to the grid element of the second discharge device, and frequency determining control potential producing means interconnecting said grid elements and operative by a potential change at the grid element of the second discharge device to produce at the grid element of the first discharge device a control potential delayed in time with respect to said potential change but of the same polarity as the latter.

7. A free-running multivibrator comprising first and second electron discharge devices each having cathode, grid and plate elements connected to sources of operating potential, the potential on the grid element of the first discharge device functioning to control the operation of the multivibrator, and said grid element being characterized by exhibiting hysteresis over a region of said control, signal feedback means connecting said cathode elements together, means for varying the cathode potential for adjusting the limits of said hysteresis region, means connecting the plate element of the first discharge device to the grid element of the second discharge device, and control potential producing means interconnecting said grid elements and operative by a potential change at the grid element of the second discharge device to produce at the grid element of the first discharge device a control potential delayed in time with respect to said potential change but of the same polarity as the latter.

8. The free-running multivibrator of claim 7 wherein the means for varying the cathode potential comprises a variable resistance interconnecting said cathode elements.

References Cited in the file of this patent

UNITED STATES PATENTS

| | | |
|---|---|---|
| 2,338,395 | Bartelink | Jan. 4, 1944 |
| 2,443,992 | Moore | June 22, 1948 |
| 2,620,455 | Fockler | Dec. 2, 1952 |
| 2,701,311 | Gray | Feb. 11, 1955 |
| 2,764,681 | Howell | Sept. 25, 1956 |

UNITED STATES PATENT OFFICE
CERTIFICATE OF CORRECTION

Patent No. 2,826,694                            March 11, 1958

Richard L. Ropiequet

It is hereby certified that error appears in the above numbered patent requiring correction and that the said Letters Patent should read as corrected below.

Column 1, line 49, for "place" read -- placed --; column 2, line 27, for "sapable" read -- capable --; column 5, line 5, for "carthode" read -- cathode --; lines 66 and 67, column 6, lines 5 and 6, and lines 32 and 33, strike out "to the grid element of the said one discharge device", each occurrence.

Signed and sealed this 23rd day of February 1965.

(SEAL)
Attest:

ERNEST W. SWIDER                                  EDWARD J. BRENNER
Attesting Officer                                     Commissioner of Patents